United States Patent
Bringedal et al.

(10) Patent No.: US 7,526,407 B2
(45) Date of Patent: Apr. 28, 2009

(54) DETECTION OF WATER BREAKTHROUGH

(75) Inventors: Bjørn Øyvind Bringedal, Oslo (NO); Egil Birkemoe, Oslo (NO); Svein Arne Morud, Bekkestua (NO); Hallgeir Melbø, Oslo (NO)

(73) Assignee: ABB AS, Billingstad (NO)

( * ) Notice: Subject to any disclaimer, the term of this patent is extended or adjusted under 35 U.S.C. 154(b) by 118 days.

(21) Appl. No.: 10/578,354

(22) PCT Filed: Nov. 5, 2004

(86) PCT No.: PCT/NO2004/000337

§ 371 (c)(1),
(2), (4) Date: May 14, 2007

(87) PCT Pub. No.: WO2005/045371

PCT Pub. Date: May 19, 2005

(65) Prior Publication Data

US 2007/0276603 A1 Nov. 29, 2007

(30) Foreign Application Priority Data

Nov. 5, 2003 (NO) .................................. 20034935

(51) Int. Cl.
*G06F 19/00* (2006.01)
(52) U.S. Cl. ........................................ 702/182; 73/861
(58) Field of Classification Search ............... 702/6, 702/14, 130, 138, 185; 73/861, 861.02, 861.95, 73/199, 204.19, 204.23, 861.49, 861.64
See application file for complete search history.

(56) References Cited

U.S. PATENT DOCUMENTS

| 4,501,156 | A | 2/1985 | Kretschmer et al. |
| 5,099,697 | A | 3/1992 | Agar |
| 5,400,657 | A | 3/1995 | Kolpak et al. |
| 6,119,710 | A | 9/2000 | Brown |
| 2006/0122777 | A1 * | 6/2006 | Patzek et al. .................... 702/6 |

FOREIGN PATENT DOCUMENTS

EP 0493 886 A1 7/1992

OTHER PUBLICATIONS

Bryan T. Yocum, Daniel Dunbar, Denis F. Pinto; Benefits Derived from the Application of Virtual Metering Production Simulation Software (VMSS3); *nel* technology for life; pp. 1-24; Oct. 22, 2002.

* cited by examiner

*Primary Examiner*—Edward Raymond
(74) *Attorney, Agent, or Firm*—Venable LLP; Eric J. Franklin

(57) ABSTRACT

A method for detecting water breakthrough in a well production. A model, of which the accuracy is known, will receive three of the four following parameters: inlet pressure, inlet temperature, outlet pressure, outlet temperature. The model includes a three-phase flash model including heat of evaporation of water and partial pressure of water with or without dissolved components lowering the vapor pressure such as salt and/or alcohol. Based on the three parameters the model computes the fourth parameter, whereupon the actual fourth parameter is measured and compared to the computed fourth parameter. If the deviation between the measured and the computed parameter is considerably larger than that which can be explained from the level of confidence of the selected model and uncertainty of measurement, it can be concluded that a water breakthrough has actually occurred.

12 Claims, 4 Drawing Sheets

DETECTION OF WATER BREAKTHROUGH

CROSS-REFERENCE TO RELATED APPLICATIONS

This application claims priority to Norwegian patent application 2003 4935 filed 5 Nov. 2003 and is the national phase under 35 U.S.C. § 371 of PCT/NO2004/000337.

1. Field of Invention

The present invention relates to a method of detecting water breakthrough and determining the water cut of a production well.

2. Prior Art

A well-known problem in the oil and gas industry is detection of the initial free water production in a production well from an oil/gas reservoir. At initial start-up of most production wells, only a small amount of water vapour is produced. At some point in time after the first start of a production well, liquid water will be produced together with the oil and/or gas. This water originates from the formation water or water injected to other wells for increasing the pressure and thus the recovery factor.

In this context the concept "water breakthrough" should be understood to mean the time when liquid water starts to be produced from the reservoir.

The reasons for why detection of water breakthrough and continued production of water is important are i.a. as follows:

Water may cause hydrate formation and blockage of the production system. It is often required to inject hydrate inhibitors on a continuous basis to prevent this. When the water production increases, the amount of hydrate inhibitors must be correspondingly increased in order to keep pace with the water production. Thus, it is important to know when the water production starts and how big it is.

Water may cause severe corrosion problems in the production system. To prevent corrosion, corrosion inhibitors must normally be injected in amounts proportional to the rate of water production.

Salts entrained in the water may precipitate as "scale". To prevent precipitated salt from blocking various parts of the production system, scale inhibitors must be injected immediately upon water being produced.

For operating the reservoir and updating various geologic and reservoir models, it is very important to know when and how much formation water is produced and whether injected water is entering into the production well.

The existing methods for detection of water breakthrough are mostly based on instruments that measure the capacitance of the production flow. There are also methods based on absorption of gamma rays in the production flow. These methods are expensive with respect to purchasing as well as maintenance, particularly in connection with sea bottom installation, while also requiring complicated electronics subjecting them to many errors. Methods based on gamma sources are a problem with a view to safe handling. In addition, current methods suffer from the following drawbacks:

They provide results that often depend on oil and gas density, salt content and flow régime. These parameters are most often unknown.

Capacitive methods do not work for water with little salt.

Capacitive methods are very vulnerable to incorrect measurements in case water film forms on the wall.

The prior methods are subject to errors resulting from salt depositing (scaling).

The water detection boundary is high, i.e. considerable time elapses between the actual water breakthrough and the time when there is sufficient water in the production flow to be measurable.

U.S. Pat. No. 5,400,657 (Atlantic Richfield Company) and a publication by B. T. Yocum et al. entitled "Benefits derived from the application of Virtual Metering Production Software (VMSS3)", 20th International North Sea Flow Measurement Workshop 2002, describes in general terms how water, oil and gas rates could be estimated by means of software comparing measured and computed pressure and temperature drop. They do not mention anything as to using a three-phase flash which includes the evaporation heat of water, or as to the fact that the water phase includes dissolved components for lowering the vapour pressure such as salt and alcohol, or the fact that by including three-phase flash, one can detect whether a so-called water breakthrough has occurred with extremely low water mass fraction (below about 5 ppm) relative to the total well flow. It is well known in the industry that water breakthrough can be detected by a rapid rise in wellhead temperature without any rise in oil or gas rate. This rise in temperature is the normal condition and is caused by the high heat capacity of water. The present invention is capable of detecting water breakthrough much earlier (at much lower water fraction) and is based on a totally different principle suited for wells having a particularly high fluid temperature.

BRIEF SUMMARY OF THE INVENTION

The present invention provides a method that does not suffer from the above disadvantages.

BRIEF DESCRIPTION OF THE DRAWINGS

In what follows a more comprehensive description is provided of advantageous embodiments according to the present invention with reference to the appending figures in which.

DETAILED DESCRIPTION

Figure 1:
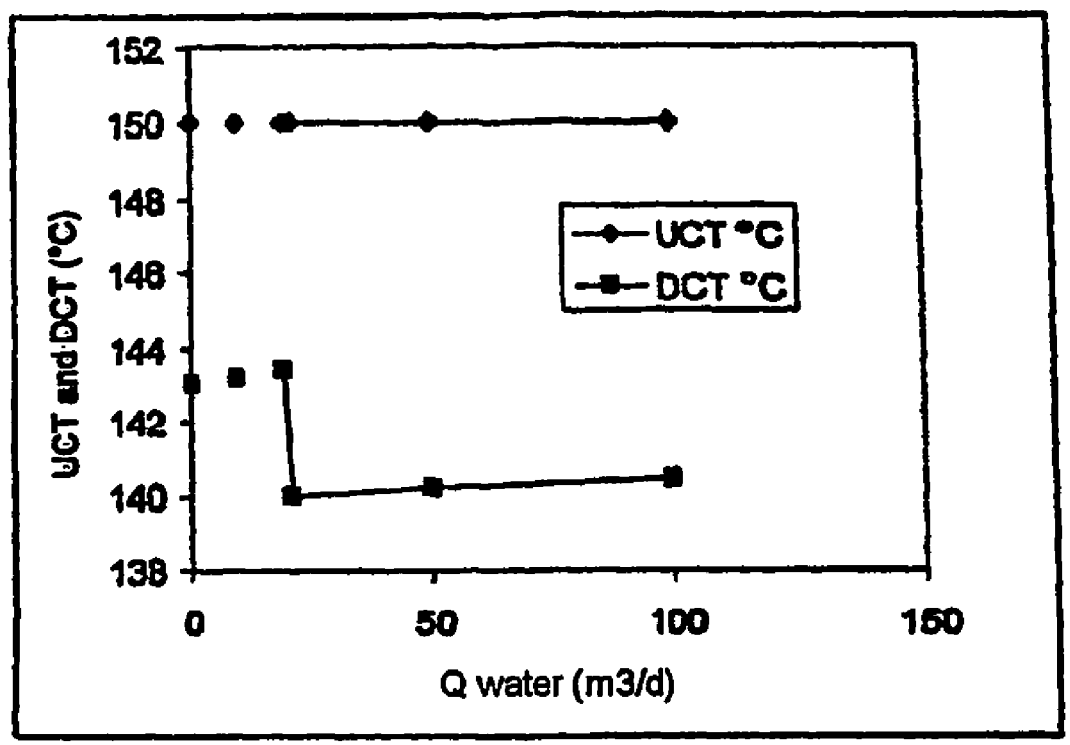
FIG. 1 shows the effect of water on the temperatures downstream of a pressure drop element computed by means of a three-phase isenthalpic flash model.
Figure 2:
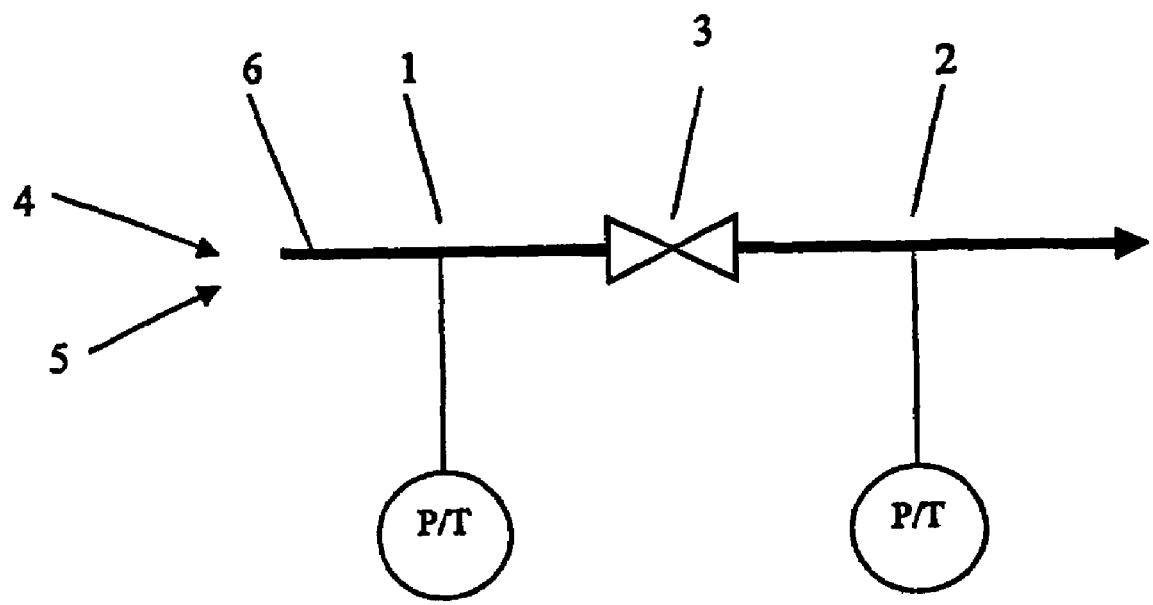
FIG. 2 shows a pressure drop element and the measuring points.

The present invention is mainly based on comparing measured temperature drops to computed temperature drops at measured pressure drops. The present invention is particularly suitable for so-called HTHP wells (High Temperature High Pressure), which are distinctive at the following conditions:

High temperatures—above about 80° C.

The pressure ratio of upstream and downstream pressures is considerably higher than 1 (minimum about 1.5).

Further, the following presuppositions are basic:

Both pressure and temperature must be measured both upstream and downstream of the pressure drop element (which must have a pressure ratio of at least about 1.5)

There must be a very small amount of water, less than that which is necessary to saturate the hydrocarbon gas phase (or about) downstream of the pressure drop element, but more than that which is needed to saturate the hydrocarbon gas phase (or dense-phase) upstream of the pressure drop element. With other words; there is liquid water upstream of the pressure drop element, but not downstream of the pressure drop element.

According to a first aspect of the invention, there is provided a method for detecting water breakthrough in the production flow. This constitutes the qualitative part of the present invention. The production flow 6, when flowing from the reservoir up to the surface, will pass one or more pressure drop elements 3, such as the adjacent well zone, the well tubing, choke valves (choker), pipelines, etc., across which the pressure drops considerably. This pressure drop results in a temperature change which could be both positive and negative. If the pressure is high the temperature will often increase across the pressure drop element owing to the so-called negative Joule-Thompson effect. In addition it will then often be a so-called retrograde condensation of liquid hydrocarbon (condensate). At lower pressures the effect will often be the opposite, the temperature drops owing to positive Joule-Thompson effect and hydrocarbon condensate will evaporate. These are model effects that are contemplated in the present invention. Water in the well flow may be in the form of water vapour or free water. The separation of water in the form of vapour and water in the form of liquid is dependent on the total pressure. The higher the pressure is, the more liquid water will be present. With small amounts of produced water from the reservoir, all of the water will be in the form of vapour even at high pressures. In this situation the temperature will be insignificantly affected by changes in the water production rate. The present invention is preferably used in a situation where total water rate is higher than that.

With only a small increase in the amount of produced water, the hydrocarbon gas will be saturated with water vapour even at lower pressures, and then one would not observe any significant effects of changes in the water production rate. The present invention is preferably used in a situation in which the total water rate is lower than that.

In addition, the present invention is preferably used under conditions in which there is a sufficiently large pressure ratio (minimum about 1.5, but dependent on the accuracy of the temperature sensors), so that the effect is detectable. Further, the present invention is preferably used under conditions of temperatures above about 80° C., so that the water vapour pressure is sufficiently high to permit evaporation of enough water and so that a temperature drop caused by the evaporation heat of the water can be detected by conventional, commercially available temperature sensors. It should be appreciated, however, that more accurate future temperature sensors could widen the use of the invention.

Changes in the water rate influence on the temperature downstream of the pressure drop element are illustrated in the following table.

In Example 1 the upstream pressure is 500 bara, the upstream temperature 140° C. and the pressure ratio 2.5 between upstream and downstream pressures. In Example 2 the upstream pressure is 200 bara, the upstream temperature 80° C. and the pressure ratio 1.5 between upstream and downstream pressures.

| Example | Mass fraction water (−) | Pressure ratio (−) | Temperature drop due to water (° C.) |
|---|---|---|---|
| 1a | 0 | 2.5 | 0.0 |
| 1b | 0.0031 | 2.5 | 0.0 |
| 1c | 0.0081 | 2.5 | 5.3 |
| 1d | 0.009 | 2.5 | 5.3 |
| 2a | 0 | 1.5 | 0.0 |
| 2b | 0.0012 | 1.5 | 0.0 |
| 2c | 0.0017 | 1.5 | 0.5 |
| 2d | 0.002 | 1.5 | 0.5 |

It appears from the table that the temperature is not affected by variations in water rate between Examples a and b and between Examples c and d. The change in temperature takes place only between Examples b and c. It also appears from the table that in Example 2, with relatively low temperature and low pressure ratio, the temperature drop due to evaporation of water is so small that accurate temperature measurements are needed in order to be able to detect the difference. Current accuracy of temperature sensors used in oil and gas production systems is ±0.5° C., so that Example 2 would be in the borderland of what would function with current temperature sensors.

FIG. 1 shows the same phenomena as the table.

The following description explains how the method according to the present invention could be implemented in a software tool:

The conditions are assumed to be such that water will evaporate across the pressure loss element (FIG. 1). This evaporation causes the temperature 2 after the pressure drop element to be lower than that which is computed by means of a model for the isenthalpic process across the pressure drop element if no free water is present upstream of the pressure drop element (FIG. 1). By continuously measuring and monitoring the temperature and pressure before and after the pressure drop element 1, 2, a clear indication of water breakthrough will be obtained when this temperature and pressure deviation is detected. If new computations are performed assuming that this time free water will be present upstream of the pressure drop element 3 and this computation also yields a temperature drop consistent with the measurement, then the conclusion must be that a water breakthrough has occurred. The model for the isenthalpic process across the pressure drop element 3 must include partial pressure of water vapour as a function of the temperature and evaporation of water as a result of the temperature.

In order to provide more and possibly better measurement values, the pressure drop element 3 can be throttled back or opened, so that the pressure drop across the pressure drop element can be increased or reduced. This could be used to draw a graph of the relation between pressure drop and temperature drop across the pressure drop element (FIG. 1). This would enhance the reliability and accuracy as to detection of water breakthrough as well as to quantification of the water production rate.

A next step is numerical determination of the amount of water in the production. This constitutes the quantitative part of the present invention.

Figure 3:
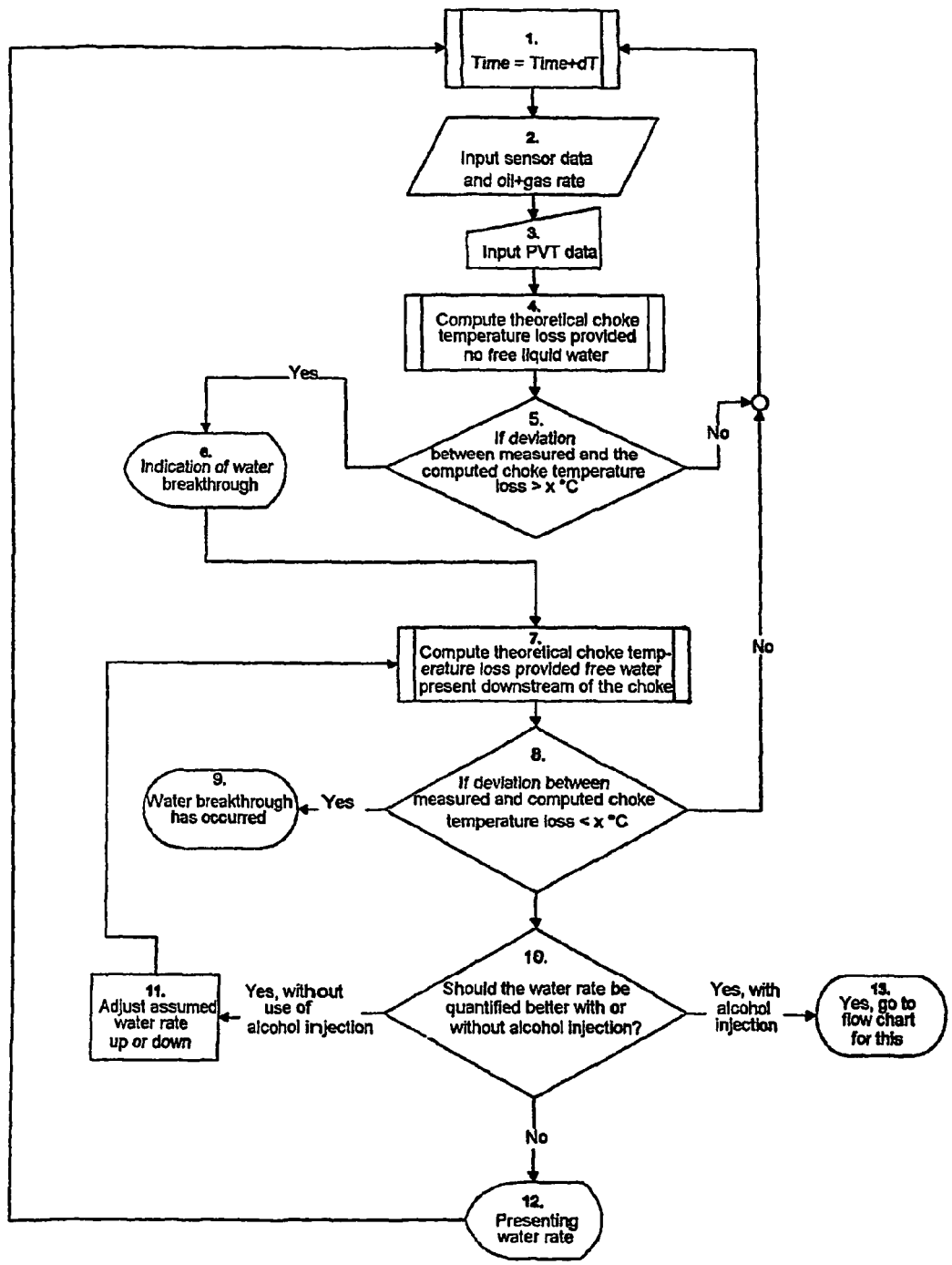
FIG. 3 is a flow chart showing the steps that are required to perform the qualitative part of the invention and the quantitative part of the invention without the use of alcohol.

FIG. 3 is a flow chart in which the logical steps that are performed according to an embodiment of the present invention for indicating water breakthrough are presented, while also describing a way of computing the amount of water without injection of alcohol.

Temperature and pressure 1, 2 are measured and monitored before and after a pressure drop element 3, in which the measurements together with other relevant process parameters 4, such as flow rate, composition, etc., are implemented in a model for computing expected pressure and temperature after the pressure drop element 3, in which the result from the model is compared to the actual pressure and temperature measurements 1, 2. A considerable deviation in the form of a higher than expected temperature drop downstream of the pressure drop element 3 is an indication that a water breakthrough has occurred. One can conclude that a water breakthrough has actually occurred if this deviation agrees with the deviation that is computed with a model for an isenthalpic (or flow) process across a pressure drop element 3 including additional cooling effect due to water evaporation.

According to the present invention the model, which has a known accuracy, will receive three of the four following parameters: pressure at inlet, temperature at inlet, pressure at outlet, temperature at outlet. The model encompasses a three-phase flash model that includes heat of evaporation of water and partial pressure of water with or without dissolved water vapour lowering components such as salts and/or alcohol. Based on the said three parameters, the model will compute the fourth parameter, whereupon the actual fourth parameter is measured and compared to the computed fourth parameter. If the deviation between the measured and computed parameter is considerably larger than that which could be explained from the level of confidence of the selected model and measuring uncertainty, then one can conclude that a water breakthrough has actually taken place.

After having detected a water breakthrough, one may assume a water rate, whereupon a theoretical temperature drop across the pressure drop element is computed based on the assumed water rate, in which the theoretical temperature drop downstream of the pressure drop element is compared to the actual pressure and temperature measurements 1, 2, in which the assumed water rate corresponds to the actual water rate if the deviation between the theoretical temperature drop downstream of the pressure drop element and the actual pressure and temperature measurements 1, 2 are below a predetermined value, in which the assumed water rate is adjusted further up or down if the deviation between the theoretical temperature drop downstream of the pressure drop element and the actual pressure and temperature measurements 1, 2 are above the predetermined value, while repeating this until the deviation between the theoretical temperature drop downstream of the pressure drop element and the actual pressure and temperature measurements 1, 2 is below the predetermined value and one may conclude that the assumed water rate corresponds to the actual water rate.

A considerable deviation may be 2*(the uncertainty of the model+the uncertainty of measurement of the temperature drop with which the model is compared), for example, or a deviation laying beyond a statistically based confidence interval of the model and the sensors used.

NUMERICAL EXAMPLE

The principles according to the present invention are described in more detail as follows: The temperature and pressure of the well flow 6 (including oil, gas and possibly free water) are measured both upstream and downstream of the pressure drop element 1, 2. The temperature 2 downstream of the pressure drop element DCT is computed by means of a heat evaporation model for water based on Joule-Thompson cooling of mixtures, in addition to a heat balance model around the production 3 if alcohol is injected upstream of the DCT measurement.

It has been computed that the temperature drop across the pressure drop element upon a water breakthrough at a pressure drop from 500 bar to 200 bar. This would easily be detected based on computations as described above.

The effect of the water on the DCT measurement is computed by means of a so-called isenthalpic three-phase flash model (water, oil, gas).

UCT=the temperature upstream of the pressure drop element.

DCT=the temperature downstream of the pressure drop element.

The mass flow of HC (hydrocarbons) with 2000 $Sm^3/d$ oil and a GOR (Gas-Oil-Ratio) of 1240 is:

HC_Mass flow=2000*(810+1240*0.93)/24/3600=45 kg/s

The molecular weight of the HC mixture is 34.3 kg/kmol=0.0343 kg/mol

HC_Mol flow=45/0.0343=1312 mol/s

Operating Data:

| Place | P (bara) | T (° C.) | $P\_H_2O$ (bara) | $Y\_H_2O$ (−) | N (mol/s) |
|---|---|---|---|---|---|
| Reservoir | 900 | 170 | 7.9 | 0.0088 | 11.5 |
| Upstream of the pressure drop element | 500 | 150 | 4.8 | 0.0096 | 12.6 |
| Downstream of the choke | 200 | 143 | 3.9 | 0.0195 | 25.6 |

P = Pressure
T = Temperature
$P\_H_2O$ = Vapour pressure above free water
$Y\_H_2O$ = Mole fraction $H_2O$ in hydrocarbon dense (plus gas) phase
N = Mole flow of $H_2O$ dissolved in the hydrocarbons with 45 kg/s HC Across the pressure drop element 25.6−12.6=13 moles/s of water evaporate provided there is free water to be evaporated. Evaporation of 13 moles/s of water requires the following heat effect: 13 moles/s*18/1000 kg/moles*2750 kJ/kg=644 kJ/s~0.64 MW (from vapour table: heat of evaporation of water is 2750 kJ/kg).

The evaporation of water across the pressure drop element causes an increased temperature drop ($\Delta T$) is computed as follows:

HC_Mass rate*Cp*$\Delta T$=0.64*$10^6$

HC_Mass rate=45 kg/s

Cp=specific heat capacity of HC=3000 kJ/kg/K $\Delta T$=~4.7° C.

The production rate of free water from the reservoir needed to obtain this temperature drop across the pressure drop element is computed to be:

13 mol/s*0.018 kg/mol*24*3600/(1000 kg/$m^3$)=20 $m^3$/d

This numerical example is somewhat simplified. The following additional aspects are included in a preferred model of the present invention:

3 phase "flasher". The three phases are: i) water/alcohol phase, ii) oil/condensate phase (liquid hydrocarbon) and iii) gas phase that includes natural gas (hydrocarbon gas), water vapour and alcohol vapour. In some cases oil and gas may be one phase, either because the bubble point pressure of the oil is exceeded or because it is a so-called "dense phase". A flash is a balance computation which is carried out to find the distribution of the components of the three phases. For this invention the distribution of water molecules, alcohol molecules and oil/gas molecules in the three phases are computed.

The partial pressure of water as a function of temperature and concentration of salt plus other dissolved components (alcohols) in the water phase.

The partial pressure of alcohols as a function of temperature and concentration of these alcohols plus salt in the water phase.

When methanol or glycol evaporate from the water phase, the concentrations of these components will increase and the partial pressure of water decrease.

The water phase includes sodium chloride and other water soluble components (for example methanol or glycols) which are used to reduce the freezing point and/or the hydrate forming temperature in oil production systems.

The solubility of sodium chloride in water. When water evaporates then salt will concentrate which may then start to precipitate (i.e. the concentration has reached its maximum point).

Figure 4:
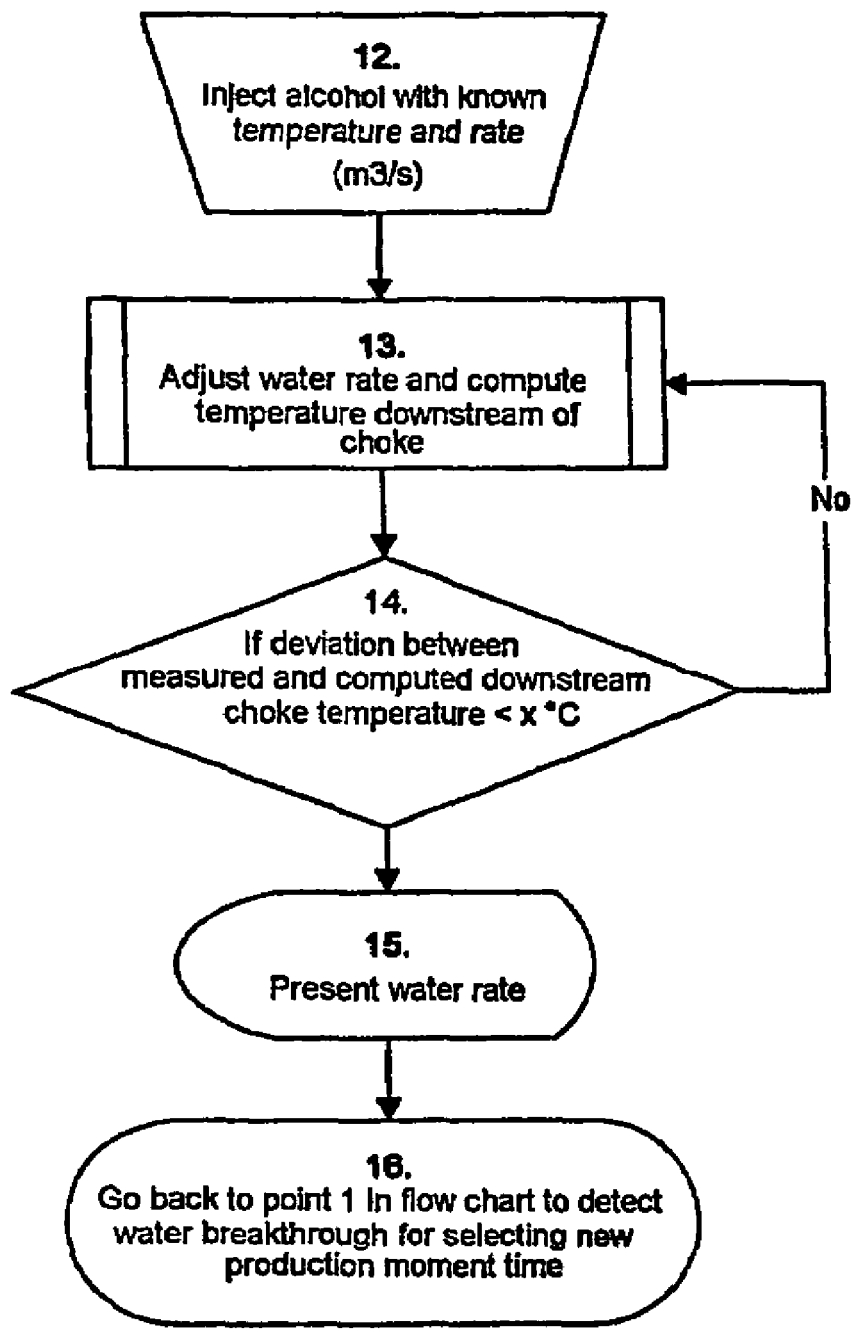
FIG. 4 is a flow chart showing the steps necessary to perform the quantitative part of the invention by means of alcohol.

FIG. 4 shows a flow chart for quantification of the amount of water by means of alcohol.

Upon detection of a water breakthrough, a known amount of alcohol 5 with known temperature can be injected in the production flow upstream of a pressure drop element 3 to provide a change in temperature drop across the pressure drop element which is used to compute the flow rate of produced water from the well, the computation being carried out by means of a thermodynamic model comprising the physical processes that are -of essential importance to the pressure drop across a pressure drop element.

As mentioned above, a hydrate inhibitor 4 must be injected into the production to prevent the formation of hydrates. The hydrate inhibitor preferably comprises an alcohol in the form of methanol or glycol, for example. Having detected a water breakthrough, a known amount of alcohol 5 is injected into the production flow 4 upstream of the pressure drop element. The temperature after the pressure drop element will then change depending on the ratio between amount of produced water and injected alcohol.

The temperature computation model for quantification of the water rate by injecting a known volume flow rate of alcohol comprises a heat balance between the inflows (well flow and alcohol) and the collecting outflow in addition to that which is mentioned under the numerical example for detecting water break-through.

This model can be used to compute how much water is produced based on change in temperature drop across a pressure drop element if the following are known in addition to pressure and temperature upstream and downstream of the pressure drop element:

Flow rate of oil and gas 4.

Flow rate of alcohol 5.

The temperature of the alcohol that is injected.

Upon quantification of the water rate in the production, the result may be used to choke the production from a well for reducing the quantified water production amount down to the maximum water processing capacity of the receiving process plant.

Optionally or alternatively, the result of the quantification can be used to choke the production from a well in order to reduce the quantified water production amount down to the maximum water treatment capacity in the receiving processing plant.

The method according to the present invention may be implemented as software, hardware or a combination thereof.

A computer program product which implements the method or parts thereof will comprise a software or a computer program that may be run on an ordinary or especially adapted computer, processor or microprocessor. The software will comprise code elements for computer program or software code parts to make the computer carry out the method by utilizing at least one of the steps described in FIGS. 3 and/or 4. The program may be stored partly or entirely on one or more suitable data-readable media or data storage means, such as a magnetic plate, CD-ROM, DVD-ROM, hard disc, magneto-optical storage means, RAM, ROM, flash storage, a fixed software and/or on a data server. The computer product or software could also be available from a net, such as internet.

The invention claimed is:

1. A method for detecting water breakthrough in a well production, the method comprising: measuring and monitoring temperature and pressure before and after a pressure drop element; implementing the measurements together with other relevant process parameters in a model for calculating expected pressure and temperature after a pressure drop element; comparing the result from the model to the actual pressure and temperature measurements; receiving with the model three of the four following parameters, inlet pressure, inlet temperature, outlet pressure, outlet temperature, said model comprising a three-phase flash model that includes heat of evaporation of water and partial pressure of water with or without dissolved components lowering the water vapor pressure such as salt and/or alcohol; calculating with said model the fourth parameter based on the three given parameters; measuring the actual fourth parameter; and comparing the actual fourth parameter to the computed fourth parameter, and determining that a water breakthrough has actually occurred if the deviation between the measured and the computed parameter is considerably larger than that which could be explained from the level of confidence of the model and the uncertainty of measurement.

2. The method according to claim 1, further comprising:
adjusting up or down an assumed water rate upon detecting the water breakthrough;
computing a theoretical temperature downstream of the pressure drop element based on the assumed water rate;
comparing the theoretical temperature downstream of the pressure drop element to the actual pressure and temperature measurements, wherein the assumed water rate corresponds to the actual water rate if the deviation between the theoretical temperature drop and the actual pressure and temperature measurements is below a predetermined value;
further adjusting the assumed water rate up or down if the deviation between the theoretical temperature drop and the actual pressure and temperature measurements is above the predetermined value; and
repeating the further adjustment until the deviation between the theoretical temperature drop and the actual pressure and temperature measurements are below the predetermined value and one can ascertain that the assumed water rate corresponds to the actual water rate.

3. The method according to claim 1, further comprising:
upon having detected the water breakthrough, injecting a known amount of alcohol of known temperature into the production flow upstream of the pressure drop element, resulting in a change in temperature drop across the pressure drop element that is used for computing the flow rate of produced water from the well, said computation being performed by means of a thermodynamic model comprising the physical processes of essential importance to the temperature drop across the pressure drop element.

4. The method according to claim 1, wherein the method is performed on-line.

5. The method according to claim 4, wherein the method is performed in real-time.

6. The method according to claim 1, further comprising:
adjusting the injection rate of inhibitor to obtain recommended concentration(s) of inhibitor(s) in the water phase.

7. The method according to claim 6, wherein the inhibitor comprises at least one of hydrate scale or corrosion inhibitor.

8. The method according to claim 2, further comprising:
choking back the production from a well for reducing the quantified amount of water production, so that at maximum injection rates of inhibitor(s) recommended concentration(s) of inhibitor(s) in the water phase is (are) obtained.

9. The method according to claim 2, further comprising:
choking back the production from a well for reducing the quantified amount of water production down to the maximum water processing capacity in the receiving process plant.

10. A computer program product, comprising:
a computer readable medium;
computer code means recorded on the computer readable medium and executable by a processor for performing the steps of:
measuring and monitoring temperature and pressure before and after a pressure drop element,
implementing the measurements together with other relevant process parameters in a model for calculating expected pressure and temperature after a pressure drop element,
comparing the result from the model to the actual pressure and temperature measurements,
receiving with the model three of the four following parameters, inlet pressure, inlet temperature, outlet pressure, outlet temperature, said model comprising a three-phase flash model that includes heat of evaporation of water and partial pressure of water with or without dissolved components lowering the water vapor pressure such as salt and/or alcohol,
calculating with said model the fourth parameter based on the three given parameters,
measuring the actual fourth parameter; and
comparing the actual fourth parameter to the computed fourth parameter, and determining that a water breakthrough has actually occurred if the deviation between the measured and the computed parameter is considerably larger than that which could be explained from the level of confidence of the model and the uncertainty of measurement.

11. The computer program product according to claim 10, characterised by working via a net, such as internet.

12. Use of a method according to claim 1, comprising:
using the method in a process of oil and/or gas production.

* * * * *